(12) United States Patent
Fobelets et al.

(10) Patent No.: US 9,334,574 B2
(45) Date of Patent: May 10, 2016

(54) HYDROGEN FLUORIDE SUPPLY UNIT

(75) Inventors: Alain Fobelets, Brussels (BE); Philippe Morelle, Alsemberg (BE); Oliviero Diana, Vilvoorde (BE); Peter M. Predikant, Hannover (DE); Maurizio Paganin, Brussels (BE)

(73) Assignee: SOLVAY SA, Brussels (BE)

( * ) Notice: Subject to any disclaimer, the term of this patent is extended or adjusted under 35 U.S.C. 154(b) by 0 days.

(21) Appl. No.: 13/822,501

(22) PCT Filed: Sep. 12, 2011

(86) PCT No.: PCT/EP2011/065774
§ 371 (c)(1),
(2), (4) Date: Mar. 12, 2013

(87) PCT Pub. No.: WO2012/034979
PCT Pub. Date: Mar. 22, 2012

(65) Prior Publication Data
US 2013/0180609 A1    Jul. 18, 2013

(30) Foreign Application Priority Data
Sep. 16, 2010   (EP) .................................... 10177188

(51) Int. Cl.
*C25B 15/08*     (2006.01)
*B65D 90/24*     (2006.01)
(Continued)

(52) U.S. Cl.
CPC .............. *C25B 1/245* (2013.01); *B65D 90/24* (2013.01); *C25B 15/08* (2013.01); *F17C 3/00* (2013.01);
(Continued)

(58) Field of Classification Search
CPC ................. F17C 2227/042; F17C 2205/0142; F17C 2270/0171; C25B 1/245; C25B 15/08; Y10T 137/4857; Y10T 137/86196; Y10T 137/4807; Y10T 137/479; Y10T 137/4874; Y10T 137/5762; B65D 90/24
USPC ................. 137/262, 263, 266, 267, 572, 312; 222/145.7; 220/562, 564; 204/243.1
See application file for complete search history.

(56) References Cited

U.S. PATENT DOCUMENTS 2,544,285 A  *  3/1951  Osborne et al. ................ 204/247
3,476,292 A  *  11/1969  Joseph et al. .................. 222/135
(Continued)

FOREIGN PATENT DOCUMENTS

EP            1067327 A2       1/2001
EP            1258670 A2      11/2002
WO      WO 2004009873 A1     1/2004

*Primary Examiner* — Atif Chaudry

(57) ABSTRACT

A hydrogen fluoride supply unit which comprises a plurality of transportable hydrogen fluoride storage containers connected to a hydrogen fluoride supply line and a chemical plant comprising the hydrogen fluoride supply unit. Such chemical plant may be for the manufacture of fluorine, wherein the hydrogen fluoride supply line is connected to an electrolysis cell for producing fluorine by HF electrolysis of a molten salt electrolyte. A process for the manufacture of a chemical comprising using such chemical plant. Also a method for supply of hydrogen fluoride to a chemical plant, which comprises: (a) filling at least one transportable hydrogen fluoride storage container with hydrogen fluoride, (b) transporting the hydrogen fluoride storage container to the hydrogen fluoride supply unit, (c) connecting the hydrogen fluoride storage container to the hydrogen fluoride supply line, and (d) supplying hydrogen fluoride from the hydrogen fluoride storage container to the hydrogen fluoride supply line.

4 Claims, 2 Drawing Sheets

(51) Int. Cl.
*F17C 13/00* (2006.01)
*C25B 1/24* (2006.01)
*F17C 3/00* (2006.01)

(52) U.S. Cl.
CPC ..... *F17C 2201/054* (2013.01); *F17C 2205/013* (2013.01); *F17C 2205/0111* (2013.01); *F17C 2205/0142* (2013.01); *F17C 2205/0146* (2013.01); *F17C 2205/0157* (2013.01); *F17C 2205/0161* (2013.01); *F17C 2205/0326* (2013.01); *F17C 2221/037* (2013.01); *F17C 2223/0153* (2013.01); *F17C 2223/03* (2013.01); *F17C 2223/033* (2013.01); *F17C 2225/0123* (2013.01); *F17C 2225/033* (2013.01); *F17C 2227/0135* (2013.01); *F17C 2227/0192* (2013.01); *F17C 2227/042* (2013.01); *F17C 2227/044* (2013.01); *F17C 2250/0408* (2013.01); *F17C 2250/0421* (2013.01); *F17C 2260/044* (2013.01); *F17C 2270/0171* (2013.01); *F17C 2270/0518* (2013.01); *Y02E 60/321* (2013.01); *Y10T 137/479* (2015.04); *Y10T 137/4807* (2015.04); *Y10T 137/4857* (2015.04); *Y10T 137/4874* (2015.04); *Y10T 137/5762* (2015.04); *Y10T 137/86196* (2015.04); *Y10T 137/87571* (2015.04)

(56) References Cited

U.S. PATENT DOCUMENTS

| | | | | |
|---|---|---|---|---|
| 3,503,411 | A | * 3/1970 | Bauer | G05B 19/44 137/101.25 |
| 5,366,606 | A | * 11/1994 | Tarancon | C25B 11/02 204/257 |
| 5,837,027 | A | 11/1998 | Olander et al. | |
| 7,784,501 | B2 | * 8/2010 | Gershtein et al. | 141/100 |
| 2002/0078824 | A1 | 6/2002 | Tom et al. | |
| 2003/0226588 | A1 | 12/2003 | Olander et al. | |
| 2004/0108201 | A1 | * 6/2004 | Tojo et al. | 204/243.1 |
| 2006/0118175 | A1 | * 6/2006 | Mathison et al. | 137/256 |

* cited by examiner

HYDROGEN FLUORIDE SUPPLY UNIT

CROSS-REFERENCE TO RELATED CASES

The present application is a U.S. national stage entry under 35 U.S.C. §371 of International Application No. PCT/EP2011/065774 filed Sep. 12, 2011, which claims priority to European patent application N° 10177188.9 filed Sep. 16, 2010, the whole content of this application being incorporated herein by reference for all purposes.

TECHNICAL FIELD OF THE INVENTION

The present application relates to a hydrogen fluoride supply unit, a chemical plant comprising such unit and a method of hydrogen fluoride supply.

BACKGROUND

Hydrogen fluoride is useful notably as feed material for chemical manufacturing processes such as manufacture by electrolysis of molecular fluorine ($F_2$), useful for example as chamber cleaning gas in the semiconductor industry, and the manufacture of other fluorinated chemicals such as fluorinated hydrocarbons.

In reference WO 2004/009873, an apparatus and a method for the generation of fluorine by the electrolysis of hydrogen fluoride are described. The apparatus comprises: a plurality of individual fluorine generating cassettes; said individual fluorine generating cassettes being operably connected to a fluorine gas distribution system for the remote use and consumption of said fluorine gas; said fluorine generating cassettes being individually isolatable from said gas distribution system and removable from the apparatus for remote maintenance. In line 32 on page 24, it is mentioned that a supply of liquid hydrogen fluoride is held in a tank. A hydrogen fluoride vaporizer vaporizes liquid hydrogen fluoride from the tank and supplies it to the cassettes to maintain a constant concentration of electrolyte.

SUMMARY OF THE INVENTION

The invention now makes available a hydrogen fluoride supply unit which allows for stable and economic supply of HF while minimizing safety risks.

The invention concerns in consequence a hydrogen fluoride supply unit which comprises a plurality of transportable hydrogen fluoride storage containers (1) connected to a hydrogen fluoride supply line (2) wherein at least one of the hydrogen fluoride storage containers has a capacity of equal to or greater than 500 l. Preferably, all of the hydrogen fluoride storage containers have a capacity of equal to or greater than 500 l.

BRIEF DESCRIPTION OF THE DRAWING

FIG. 1 provides an embodiment wherein the HF withdrawn from the storage containers (1) is forwarded to an HF electrolysis cell (7) wherein $F_2$ is produced.

DETAILED DESCRIPTION OF THE INVENTION

Figure 1:
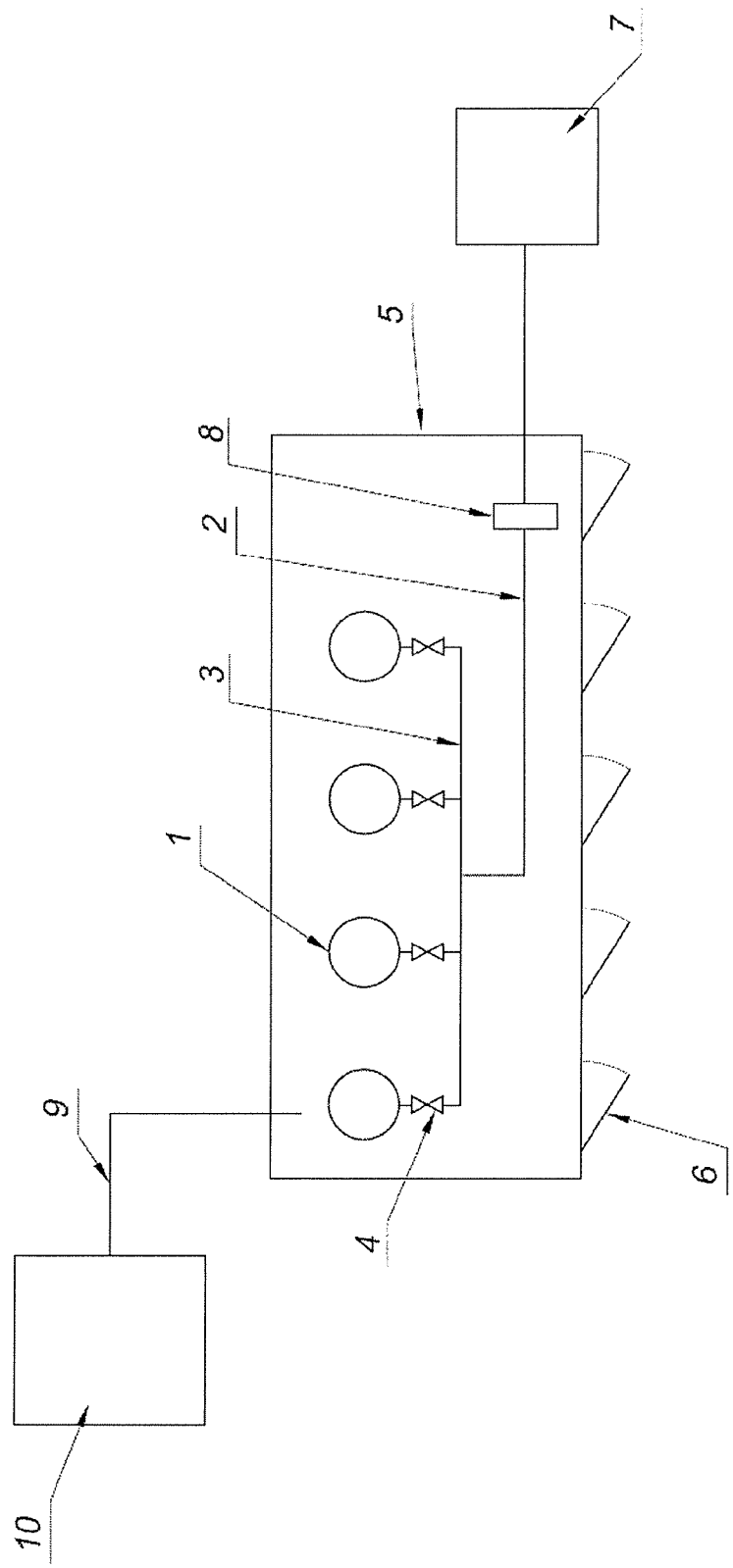
FIG. 1 shows a hydrogen fluoride supply unit of the present invention comprising storage containers (1), a hydrogen fluoride supply line (2), a manifold (3) and a remotely controlled valve (4).
Figure 2:
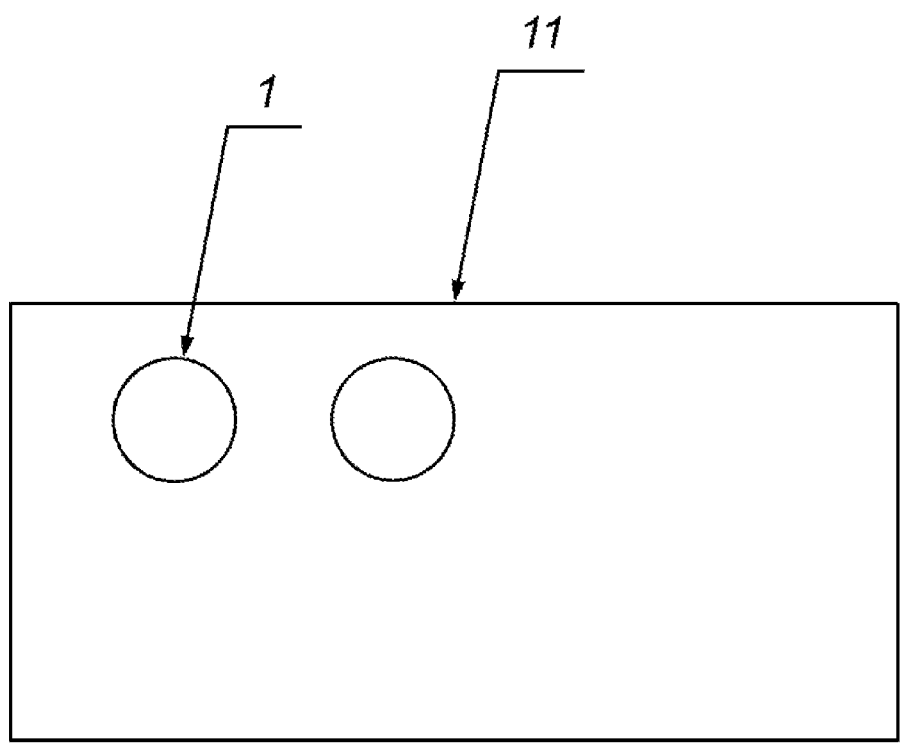
FIG. 2 shows a second container (11) used to transport more than one hydrogen fluoride storage containers according to an embodiment of the present invention.

"Hydrogen fluoride" (HF) is understood to denote in particular anhydrous hydrogen fluoride. When included in a storage container, the hydrogen fluoride is generally liquid. Preferably, no sorbent is contained in the hydrogen fluoride storage containers. Preferably, the anhydrous HF essentially consists of HF.

The hydrogen fluoride supply unit according to the invention generally comprises from 2 to 20, preferably from 3 to 10, more preferably 4, 5 or 6 storage containers.

In a particular embodiment, the hydrogen fluoride supply unit further comprises, preferably permanently, at least one hydrogen fluoride emergency container. Such hydrogen fluoride emergency container is preferably an empty hydrogen fluoride storage container as described herein, which is preferably connected to the hydrogen fluoride supply line. The hydrogen fluoride emergency container is suitably kept under pressure of an inert gas or under vacuum. The hydrogen fluoride emergency container is generally operable to receive HF from a leaking hydrogen fluoride storage container.

Means for transferring HF from a leaking HF storage container to the hydrogen fluoride emergency container include, for example, inert gas pressure or a pump.

In the hydrogen fluoride supply unit according to the invention, the hydrogen fluoride storage containers are generally hollow bodies which can optionally be mounted on wheels or which can be transported e.g., by a forklift. The hydrogen fluoride storage generally has at least a liquid line and a gas line. In that case, the liquid line can be connected, if appropriate to the hydrogen fluoride supply line, for example by means of a flange connection. The gas line can additionally be connected to an inert gas (e.g., anhydrous air or nitrogen) supply line which allows to pressurize the hydrogen fluoride storage container.

In the hydrogen fluoride supply unit according to the invention, preferably each hydrogen fluoride storage container has generally a capacity of from 500 to 5000 l, more preferably, from 500 l to 4000 l, and especially preferably from 1000 to 3000 l. Particular examples of hydrogen fluoride storage containers are tanks approved by RID/ADR-IMDG—of UN T22 or, preferably, UN T20 type. Such tanks are commercially available.

In the hydrogen fluoride supply unit according to the invention, each storage container can be suitably connected to the hydrogen fluoride supply line through a manifold (3).

In the hydrogen fluoride supply unit according to the invention, each storage container is preferably individually isolatable from the hydrogen fluoride supply line.

In the hydrogen fluoride supply unit according to the invention, the storage containers (1) can generally be isolated from the hydrogen fluoride supply line (2) by a remotely controlled device (4), preferably a remotely controlled valve. More preferably, each storage container is equipped with a remotely controlled device (4), preferably a remotely controlled valve, allowing to isolate that container from the hydrogen fluoride supply line.

When remotely controlled valves are present, manual valves are suitably installed in addition. The remotely controlled valves allow for example to operate the HF storage containers from a remote control-room.

In a preferred embodiment, the HF storage containers comprise an automatic HF level sensor. In particular the HF storage containers can be installed on weighing scales. In this preferred embodiment, preferably, a process control system, in particular an automatic process control system is operable to close the remotely controlled valve of a first, empty HF container and to open the remotely controlled valve of another second HF-containing hydrogen fluoride storage container. This embodiment is particularly effective to avoid manual handling of HF valves and to ensure a continuous HF supply.

In a preferred aspect, the valves are operable to close automatically in case of abnormal operation state, such as for example a process interruption in a process equipment connected to the HF supply line.

In another preferred aspect, the valves are operable to close automatically in case of an HF leakage in the hydrogen fluoride supply unit according to the invention. Such HF leakage can for example be caused by a leakage of optional flange connections inside the HF storage container. This avoids in particular the necessity to approach the hydrogen fluoride supply unit in this case.

More preferably the storage containers can be isolated from the HF supply line by double isolation valves having a closed isolation space. In that case, the hydrogen fluoride supply unit according to the invention suitably further comprises at least one interspace vent valve in connection with one or more closed isolation space. The interspace vent valve is generally operable to remove optionally present hydrogen fluoride from the closed isolation space. Removal can be carried out, for example, by applying vacuum. In another aspect, removal can be carried out, for example, by flushing the closed isolation space with an inert gas and/or a pressurized purging gas such as for example anhydrous air or, preferably, nitrogen. In one aspect, the removal is carried continuously. Preferably, the removal is carried out discontinuously, in particular when an HF storage container is connected to and/or disconnected from the supply line. If appropriate, gases recovered from the closed isolation space are suitably vented to an HF destruction unit, for example a scrubber.

In a preferred aspect of the hydrogen fluoride supply unit according to the invention, the hydrogen fluoride storage containers (1) are contained in an enclosed space (5) having at least a closeable door (6) allowing for entering into or removing from the enclosed space a hydrogen fluoride storage container. In one embodiment of this aspect the enclosed space contains the hydrogen fluoride storage containers and the connections to the hydrogen fluoride supply line. In another embodiment, the enclosed space contains in addition an evaporator for evaporation of liquid HF. In this preferred aspect and its embodiments, the enclosed space suitably comprises an HF sensor capable to trigger connection of the enclosed space to an HF destruction system (10). Suitably, the enclosed space is connected to the HF destruction system through a suction line (9) connected to a fan which is operable to transport gas from the enclosed space to the HF destruction system. The HF destruction system is preferably a scrubber. The scrubber suitably contains an aqueous alkaline solution, for example a KOH solution.

The invention also concerns a chemical plant comprising the hydrogen fluoride supply unit according to the invention. In a particularly preferred aspect the chemical plant according to the invention is used for the manufacture of fluorine by electrolysis of HF. In that case the hydrogen fluoride supply line (2) is generally connected to an electrolysis cell (7) for producing fluorine by HF electrolysis of a molten salt electrolyte.

In this particularly preferred aspect, it is advantageous that the plant comprise a common destruction system for $F_2$ and HF. Such common destruction system can for example be a scrubber containing an aqueous KOH-solution and optionally $Na_2S_2O_3$ or $K_2S_2O_3$.

In the chemical plant according to the invention, the aggregate capacity of the hydrogen fluoride storage containers in the hydrogen fluoride supply unit generally corresponds to from 5 to 60 days, preferably from 15 to 30 days of HF requirement of the chemical plant to produce the chemical, e.g., $F_2$, at its full capacity.

FIG. 1 shows, without intended limitation, a particular embodiment of a fluorine plant according to the invention:

A plurality of transportable hydrogen fluoride storage containers (1) is connected to a hydrogen fluoride supply line (2) through a manifold (3). Each storage container (1) can be individually isolated from the hydrogen fluoride supply line (2) by a remotely controlled valve (4). Hydrogen fluoride storage containers (1), manifold and remotely controlled valves are contained in an enclosed space (5) having a closeable door (6) allowing for entering into or removing from the enclosed space a hydrogen fluoride storage container (1). The enclosed space further comprises an HF sensor capable to trigger connection of the enclosed space to HF destruction system (10). The enclosed space is connected to the HF destruction system through a suction line (9) connected to a fan (not shown) which is operable to transport gas from the enclosed space to the HF destruction system. The hydrogen fluoride supply line (2) enters into an HF evaporator (8) operable to vaporize liquid HF, which is connected to electrolysis cell (7) in which HF can be electrolyzed to produce molecular fluorine ($F_2$).

In a particular aspect, the chemical plant according to the invention has several, for example 1, 2, 3, 4, 5, 6, 7, or 8 production lines for the manufacture of fluorine by electrolysis of HF having a corresponding number of hydrogen fluoride supply units according to the invention.

In another particular aspect, the chemical plant according to the invention may have several, for example 1, 2, 3, 4, 5, 6, 7, or 8 production lines, e.g., for the manufacture of fluorine by electrolysis of HF and a lower number, e.g., 1, 2, 3, or 4 of hydrogen fluoride supply units according to the invention.

The invention also relates to a process for the manufacture of a chemical, in particular fluorine, comprising use of the chemical plant according to the invention. The invention also relates to a method for the supply of hydrogen fluoride to a chemical plant, which comprises: (a) filling at least one transportable hydrogen fluoride storage container with hydrogen fluoride, (b) transporting the hydrogen fluoride storage container to the hydrogen fluoride supply unit, (c) connecting the hydrogen fluoride storage container to the hydrogen fluoride supply line, and (d) supplying hydrogen fluoride from the hydrogen fluoride storage container to the hydrogen fluoride supply line.

In the method according to the invention, the filling can be preferably carried out at an HF production site, where HF is produced for example by reaction of fluorspar with sulfuric acid.

In the method according to the invention, transporting the hydrogen fluoride storage container to the hydrogen fluoride supply unit generally comprises transportation by a vehicle such as ship, railway or, preferably, truck. Usually, the hydrogen fluoride storage container is loaded on and/or unloaded from the second container by suitable devices such as for example a crane or a forklift.

In a preferred embodiment of the method according to the invention, more than one hydrogen fluoride storage containers are transported in a second container (11), preferably an ISO container. In that case, the number of hydrogen fluoride storage containers in said second container is preferably lower than the number of hydrogen fluoride storage containers in the hydrogen fluoride supply unit.

In a particular example, 3 identical hydrogen fluoride storage containers having each a capacity of 2000-3000 l, preferably about 2500 l, for example UN T 20 type containers, are loaded into 1 ISO container and transported to a hydrogen fluoride supply unit according to the invention. The latter hydrogen fluoride supply unit preferably comprises 4 identical containers as described here before.

In the method according to the invention, the connecting is generally carried out with a periodicity of more than 12 days, often equal to or more than 15 days or 18 days, preferably the periodicity is more than 20 days.

A suitable method for supplying liquid HF from a hydrogen fluoride storage container to the HF supply line is to pressurize the container with an inert gas such as $N_2$.

In a preferred aspect of the method according to the invention the supplying comprises supplying hydrogen fluoride to the hydrogen fluoride supply line successively from different hydrogen fluoride storage containers. In that case, generally only one hydrogen fluoride storage container has an open connection to the hydrogen fluoride supply line. A particular successive supply scheme comprises successively supplying hydrogen fluoride from all but one hydrogen fluoride storage container.

It has been found that the fluorine supply unit according to the invention, the chemical plant according to the invention and the method according to the invention allow for reduced number of servicing and connecting operations thus minimizing hazard risk in connection with HF.

Should the disclosure of any of the patents, patent applications, and publications that are incorporated herein by reference be in conflict with the present description to the extent that it might render a term unclear, the present description shall take precedence.

The example here after is understood to illustrate the invention without however limiting it.

EXAMPLE

In an HF manufacturing plant 3 UN T 20 type containers are each filled with 2500 l of anhydrous HF and loaded with a crane into an ISO container which is loaded onto a truck. The truck transports the ISO container to a fluorine manufacturing plant, where the UN T 20 type containers are unloaded by a forklift and transported through a door into a HF storage room made of polymer coated steel having the dimensions of a sea container 3 empty UN T 20 type containers are removed from the room and loaded into the ISO container. The 3 HF containing containers are connected by an operator through standard connections to a manifold equipped with remote control valves having a further HF containing UN T 20 type container connected thereto. After connecting the operator leaves the room and shuts the door. From a control room an automatic system shuts and opens the remote control valves to have one HF containing UN T 20 type deliver HF to an HF supply line which passes through an evaporator. HF storage containers are installed on weighing scales, so that when a HF container is empty, a process control system closes the isolation valves of the empty containers and opens the valves of another container containing HF, without manual handling and without disruption of the HF supply. Gaseous HF is fed into an electrolysis cell producing $F_2$ by electrolysis of HF in KF×2HF containing molten electrolyte. The $F_2$ capacity of the plant is 150 t/year. After about 15 days of full capacity $F_2$ production, 3 full UN T 20 type HF containers are supplied and exchanged for the empty ones as described above.

The invention claimed is:

1. A method for supply of hydrogen fluoride to a chemical plant comprising a hydrogen fluoride supply unit comprising a plurality of transportable hydrogen fluoride storage containers (1) connected to a hydrogen fluoride supply line (2) and to a gas line connected to an inert gas, wherein at least one of the hydrogen fluoride storage containers is a hydrogen fluoride emergency container, said hydrogen fluoride emergency container being an empty hydrogen storage container kept under pressure of an inert gas, wherein at least one of the hydrogen fluoride storage containers has a capacity of equal to or greater than 500 l, wherein the hydrogen fluoride is anhydrous liquid hydrogen fluoride, wherein the anhydrous HF consists essentially of HF, said method comprising: (a) filling at least one transportable hydrogen fluoride storage container with anhydrous hydrogen fluoride; (b) transporting the hydrogen fluoride storage container to the hydrogen fluoride supply unit; (c) connecting the hydrogen fluoride storage container to the hydrogen fluoride supply line; (d) successively supplying anhydrous hydrogen fluoride from all but one hydrogen fluoride storage container to the hydrogen fluoride supply line, and (e), in case of a leakage, transferring liquid anhydrous hydrogen fluoride from a leaking hydrogen fluoride storage container in the hydrogen fluoride supply unit to the hydrogen fluoride emergency container by means of inert gas pressure or a pump.

2. The method according to claim 1, wherein more than one hydrogen fluoride storage containers are transported in a second container (11); and wherein the number of hydrogen fluoride storage containers in said second container is lower than the number of hydrogen fluoride storage containers in the hydrogen fluoride supply unit.

3. The method according to claim 2, wherein said connecting step (c) is carried out with a periodicity of more than 12 days.

4. The method according to claim 1, wherein said connecting step (c) is carried out with a periodicity of more than 12 days.

* * * * *